United States Patent [19]

Newcomer, Jr.

[11] 3,865,325

[45] Feb. 11, 1975

[54] FLEXIBLE TAPE REEL

[75] Inventor: William P. Newcomer, Jr., Granada Hills, Calif.

[73] Assignee: Dylaker Computer Systems, Inc., Van Nuys, Calif.

[22] Filed: July 2, 1971

[21] Appl. No.: 159,113

[52] U.S. Cl. .............. 242/68.5, 206/59 C, 242/71.8

[51] Int. Cl. .............................................. B65h 75/00

[58] Field of Search ......... 242/68.5, 176, 177, 68.6, 242/174, 178, 71.8, 159; 206/59 C, 59 E, 59 F, 52 F, 52 W

[56] References Cited

UNITED STATES PATENTS

| | | | |
|---|---|---|---|
| 2,417,574 | 3/1947 | Themak | 242/68.5 |
| 2,499,890 | 3/1950 | Themak | 206/63.3 X |
| 2,695,139 | 11/1954 | Horrath | 242/68.5 |
| 3,107,874 | 10/1963 | Wilke | 242/68.5 |
| 3,144,934 | 8/1964 | Shultz | 206/50 |
| 3,587,201 | 6/1971 | Strayer | 206/65 R |

FOREIGN PATENTS OR APPLICATIONS

| | | | |
|---|---|---|---|
| 1,203,990 | 9/1970 | Great Britain | 242/176 |

*Primary Examiner*—John W. Huckert
*Assistant Examiner*—Edward J. McCarthy
*Attorney, Agent, or Firm*—Marvin E. Jacobs

[57] ABSTRACT

A flexible, light-weight, tape reel for receiving a wound length of recording tape is disclosed. The tape reel includes a flexible, resilient central core which can be folded substantially flat for shipment or storage and which expands to a cylindrical shape for write-in to or read-out of the tape.

17 Claims, 10 Drawing Figures

PATENTED FEB 11 1975 3,865,325

SHEET 1 OF 2

INVENTOR.
WILLIAM P. NEWCOMER
BY

INVENTOR.
WILLIAM P. NEWCOMER

BY

FLEXIBLE TAPE REEL

BACKGROUND OF THE INVENTION

1. Field of the Invention

The present invention relates to data processing and, more particularly, to an improved manner of storing and handling recorded data in tape form. 2. Description of the Prior Art:

Except for relatively low speed computers, cost of computer operating time demands efficient flow of input-output data. A common mode of operation centers around the use of magnetic tape as a buffer between the computer and various input-output devices. Magnetic tape heads, read-write circuitry, and tape transport mechanisms have been refined to a point where data can be transferred to and from the computer at an acceptably high rate. Since a computer often has several magnetic tape units associated with it, at least one unit is always available for reading into or recording from the computer.

Conventional tape reels are fabricated from hard plastic materials and are fairly large, heavy and expensive. Thus, the shipping containers must be adapted to the size and shape of the rigid reel, and the total shipping weight is excessive. These reels are very durable to protect the length of tape which they carry. However, in many cases, the length of tape is only utilized once to transfer input data or a complete program into the computer memory. Therefore it is really only necessary that the length of tape be capable of being run once without problem on the magnetic tape unit. Once the program is entered into the computer memory, the particular user has no more need for the tape containing the program. Therefore, durability is not of primary concern and non-durability may be desired by the distributor of the software. Many times the distributor is requested to furnish a change in the program or wishes to update the program. This may only require a short length of tape of 50 feet or less. Yet, even these short lengths of recorded tape must be processed and shipped on the bulky and heavy rigid reels.

OBJECTS AND SUMMARY OF THE INVENTION

It is therefore an object of the present invention to provide an improved reel for flexible tape and film forms of recorded data.

Another object of this invention is the provision of a flexible, light-weight, tape reel for receiving a length of information recording tape and adapted to be mounted directly on conventional tape drives.

A further object of the invention is to simplify and reduce the cost of manufacturing, shipping and storing recorded information in tape form.

A still further object of this invention is to provide uniquely packaged forms of magnetic tape recorded data.

These and many other objects and attendant advantages of the invention will become apparent as the description proceeds.

These advantages, among others, are provided by a flexible tape reel in accordance with the invention which comprises a flexible, resilient, cylindrical core and optionally and preferably a plurality of integral, upstanding guide members extending from each side edge of the core.

The invention will now become better understood by reference to the following detailed description when considered in conjunction with the accompanying drawings in which like reference characters denote like parts throughout the drawings.

DESCRIPTION OF THE PREFERRED EMBODIMENTS

Figure 1:
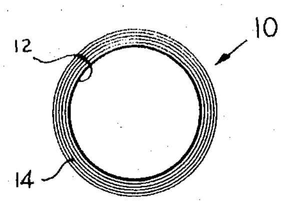
FIG. 1 is a front elevational view of a first embodiment of a tape reel in accordance with the invention.
Figure 2:
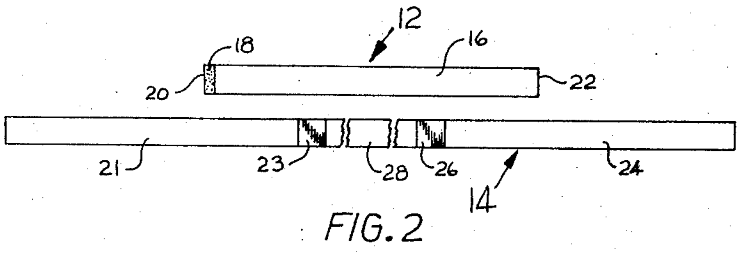
FIG. 2 is a schematic view of the core and tape construction of the embodiment of FIG. 1.

Referring now to FIG. 1, the flexible tape reel 10 of the invention generally includes a flexible core member 12 on which is wound a length 14 of recording tape. Referring now to FIG. 2, the core member 12 preferably has a slightly wider width than the tape 14. This facilitates centering on the drum drives of a tape unit since the conventional rigid reels require the extra width for the side retaining walls. Furthermore, the extra width provides protection for the sides of the tape when packaged in close fitting containers.

The core may be formed of numerous plastic materials such as metal, paper or synthetic resins of the thermoplastic or thermosetting types. The core must be non-brittle, light-weight and be capable of being folded substantially flat without distortion, assuming permanent creases or breaking, yet assume a cylindrical shape on release of pressure. Generally, resilient thermoplastic resins such as cellulose acetate, polyethylene, vinyl or polypropylene are preferred. The core may be integrally molded, extruded, cast, may be cut as cylindrical bands from extruded tubing of the appropriate diameter or may be formed by joining a length of film into a cylindrical shape. As illustrated in FIG. 2, the core may be formed from a length 16 of film. Adhesive 18 is applied to one end 20 of the film 16 and the ends 20, 22 joined to form the core 12. The wall thickness of the film depends on the tensile strength of the material used and amount of recording tape 14 to be wound on the core 12 of the reel. Typically, the film has a thickness from 5–25 mil usually about 10 mil for a thermplastic material such as cellulose acetate.

The recording tape 14 is a flexible film material capable of being activated by the selective exposure to electromagnetic radiation to form recorded indicia in a layer sensitive to the radiation. In the case of magnetic tape, the tape comprises a flexible substrate such as a 1–2 mil film of cellulose acetate, polyethylene terephthalate or unplasticized polyvinyl chloride, carrying a thin, adherent coating about 0.5 mil thick of magnetizable metal oxide particles such as gamma $Fe_2O_3$ in an organic resin binder. Generally, magnetic tapes for computer programs have a rearward lead 21 having a highly reflective patch 23 which is sensed by the drive unit to prevent unreeling the lead 21 from the core 12. The forward lead 24 also usually includes a highly reflective patch 26 for actuating the recording mechanism of the tape unit. The central portion 28 of the tape receives the recorded information.

Figure 3:
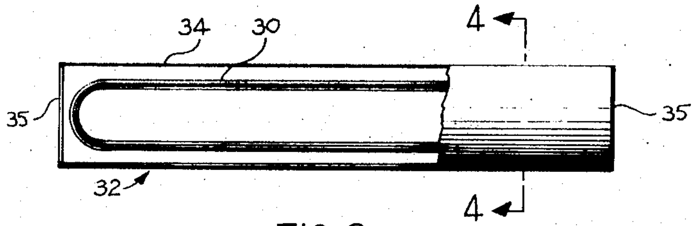
FIG. 3 is a side elevational view of a packaged tape reel of this invention.
Figure 4:
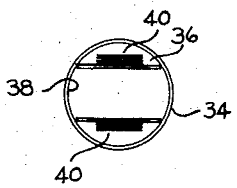
FIG. 4 is a sectional view taken on the line 4—4 of FIG. 3.

The flexible tape reel can thus be readily folded into a narrow thin oval form 30 as illustrated in FIGS. 3 and 4 which can be readily packaged in a closed, dust free container 32 such as polyvinyl chloride tube 34 closed by end plugs 35. As shown in FIG. 4, the wider ends 36 of the core 12 engage the inner wall 38 of the tube 34 and protect the sides of the tape 14 from abrasion and damage. The rigid tube 34 protects the top surface 40 of the tape from being scratched during handling, shipping or storage. The flexible tape reel 10 can also be attractively packaged on a hard card over which is formed a clear plastic cover having a pocket for receiving the folded reel 30. The card can be printed with various instructional and promotional material and may carry the mailing and shipping data.

The flexible tape reel configuration utilizing a cylindrical core wider than the tape has been constructed and successfully utilized on conventional IBM 360 magnetic tape units. However, superior handling properties and less possibility of unravelling are provided by forming upstanding side guides for the wound tape.

It has been discovered in accordance with the invention, that side guides can be formed by means of a plurality of upstanding flap members which are discontinuous at their outer extremity. Thus when bending radii are formed by folding the flexible reel, the flaps can spread to assume an expanded path concentric with the bending path of the core and prevent distortion of the reel.

Figure 5:
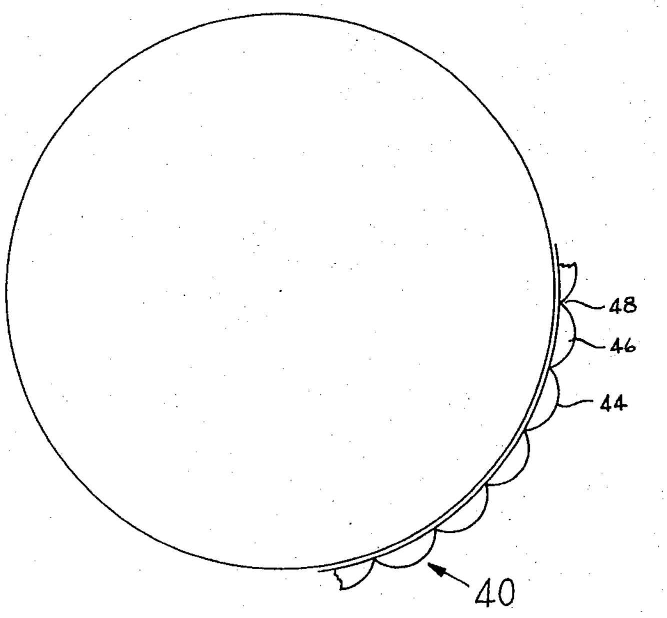
FIG. 5 is a side elevational view of a further embodiment of a flexible tape reel.
Figure 6:
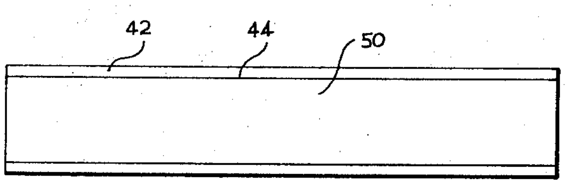
FIG. 6 is a top view of the embodiment of FIG. 5.
Figure 7:
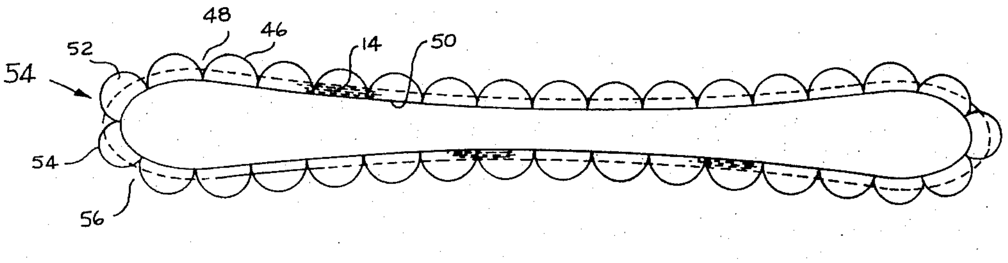
FIG. 7 is a view of the tape reel of FIG. 5 shown in folded position.

Referring now to FIGS. 5–7, a discontinuous guide 40 is formed of an L-shaped member having a base 42 for attachment to the surface of the core 12 adjacent the outer edges thereof and a side wall portion 44 at an angle no less than 90° with the surface of the core. The side wall 44 comprises a plurality of flaps 46 having separations 48 between them. The flaps are preferably rounded to avoid sharp edges which could snag or tear the tape 14. The base 42 is of a width sufficient so that the side walls 44 form a channel 50 for receiving the tape 14 and the base 42 provides the desired spacing for centering the reel 10 on the drum of the tape unit.

As shown in FIG. 7, the tabs 52 at the bends 54 of the folded reel 30 spread to form more separated spaces 56 which prevent buckling or distortion of the reel 30.

Figure 8:
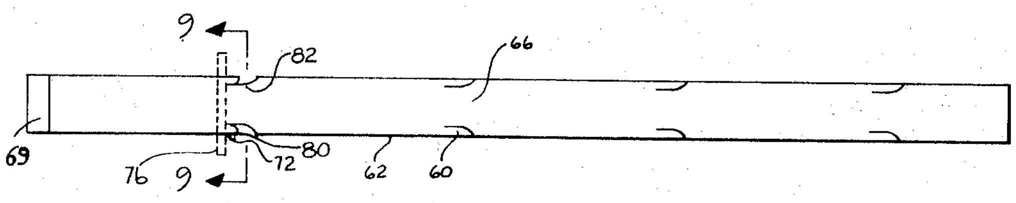
FIG. 8 is a plan view of a strip for forming another configuration of a flexible tape reel.
Figure 9:
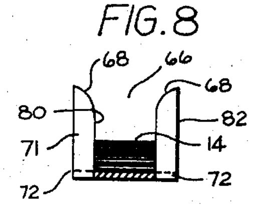
FIG. 9 is a sectional view taken on the line 9—9 of FIG. 8.

A more preferred embodiment of a tape reel with discontinuous side tabs is illustrated in FIGS. 8–9. Referring now to FIG. 8, the reel includes at least three tabs and preferably at least four tabs on each side. The tabs are formed by cutting a strip 60 parallel to the edge 62 of the core 12. The length of the strip depends on the amount of tape to be carried on the core and is suitably three sixteenths to three eighths of an inch. The strip is positioned inboard a distance adapted to center the core on the drum drive of a tape unit suitably about three thirty-seconds of an inch. A typical tape reel is three fourths of an inch wide. Therefore, nine sixteenths inch will remain between the strips to form a channel 66 for receiving ½ inch wide tape 14.

The terminal portion of the strip is rounded at 68 to form a rounded outer lip for smoothly receiving the tape 14. The core is suitably formed from a 12 inch long length of 10 mil thick acetate film. A three eights inch end portion forms an adhesion strip 69 for joining the film into a cylindrical core. This will provide a 3 and twenty-one thirty-seconds inch diameter when joined. The core may be joined by heat welding, adhesive or by solvent welding such as acetone in the case of cellulose acetate.

The strips are formed into tabs 71 by bending the strips upwardly by placing a thin, straight edge 76 at the base 72 of the cut and bending the strip upwardly to exceed the elastic limit of the outer portion of the bend. The inner edge 80 of the tab forms a guide for the film and the outer edge 82 bears against the back wall of the drum of the drive unit for proper spacing. The strip can be simply cut and bent by a combined tool in a continuous operation for forming the flexible cores. The continuous lengths are then cut and the ends joined to form the cores.

Figure 10:
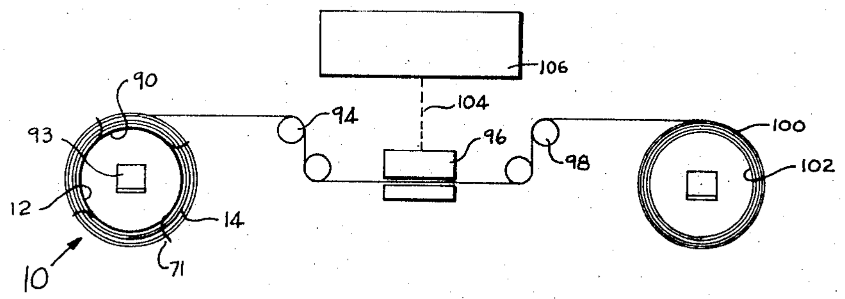
FIG. 10 is a schematic view of a tape drive unit shown with the flexible tape reel of this invention.

Referring now to FIG. 10, the flexible tape reel 10 containing a wound length of tape 14 is placed on the expandable drum 90 of a magnetic tape unit, not shown. The latch 93 is released to contract the drum and then closed to expand the drum slightly, about one-thirty-second of an inch into frictional engagement with the core 12. The lead is wound through the guide rollers 94, through the read head 96, guide rollers 98 and wound onto the takeup roll 100 on the rewind drum 102. The unit is turned on and when the start patch is sensed the head 96 will read the information on tape 14 and will send signals 104 to the computer memory 106. The unit will stop when the end patch is sensed or when a terminal magnetic signal from the tape indicates that reading is concluded. The tape 14 may be disposed or rewound onto the flexible tape reel 10.

It is to be understood that only preferred embodiments of the invention have been described and that numerous substitutions, modifications and alterations are all permissible without departing from the spirit and scope of the invention as defined in the following claims.

What is claimed is:

1. An information recording device comprising in combination:

a flexible, resilient core capable of being folded and bent into a substantially flat position and returning to an expanded position on release of the folding force;

a flexible and foldable, upwardly extending side guide disposed inwardly from each edge of the core forming a central channel, said guide being formed of an upstanding band member including at least one discontinuity formed in the band; and a length of flexible information recording tape having a width narrower than said core and substantially the width of said channel wound on said core within said channel.

2. A device according to claim 1 in which the tape includes a forward lead, a rearward lead and an intermediate recording portion therebetween.

3. A device according to claim 2 in which at least one of the leads includes a highly reflective sensing path.

4. A device according to claim 1 in which the tape is magnetic tape.

5. A device according to claim 4 in which the magnetic tape comprises a flexible substrate carrying a thin film of bistable, magnetizable material.

6. A device according to claim 1 in which the core consists essentially of a thin, light-weight, hollow cylinder of a flexible, resilient, synthetic resin.

7. A device according to claim 6 in which the cylinder has a thickness from 5–25 mils.

8. A device according to claim 7 in which the resin is cellulose acetate.

9. A device according to claim 6 in which the cylindrical core is folded into a substantially flat, oval form.

10. A device according to claim 1 in which the band comprises a plurality of discontinuities alternating with upstanding tabs.

11. A device according to claim 10 in which the tabs are integral with the core and are each formed from an upstanding member extending upwardly from the surface of the core having a height at least as great as the wound tape and having an inner edge terminating adjacent the outer edge of the tape.

12. A device according to claim 11 in which the tabs have an outer edge coincident with the edge of the core.

13. A device according to claim 12 in which the tab is a thin, flexible, strip extending upwardly from the core in a direction parallel to a plane through the axis of the core.

14. A device according to claim 13 in which the upper inner edge of each tab is rounded.

15. A device according to claim 14 in which the tab is coincident in shape with the discontinuity.

16. A method of manufacturing an information recording tape reel comprising the steps of:

forming a flexible, resilient core from a flexible, lightweight, thin film of a resilient, synthetic resin;

cutting the core at a plurality of spaced points along each edge of the core with a generally L-shaped cut having a side portion generally parallel to the edge of the core and of a length at least equal to the thickness of the wound tape;

bending the L-shaped strip formed by the cut upwardly along the base of the cut at an angle sufficient to form a permanent bend at said base whereby a central channel is formed between the opposed side portions of the strips; and winding a length of flexible information recording tape on the core within the central channel.

17. A method according to claim 16 further including the step of rounding the upper, inner, corner of the strip.

* * * * *